(12) United States Patent
Howell et al.

(10) Patent No.: US 7,093,440 B2
(45) Date of Patent: Aug. 22, 2006

(54) FLOATING LINER COMBUSTOR

(75) Inventors: Stephen John Howell, West Newbury, MA (US); Barry Francis Barnes, Milford, CT (US); Timothy Patrick McCaffrey, Swampscott, MA (US); John Carl Jacobson, Melrose, MA (US)

(73) Assignee: General Electric Company, Schenectady, NY (US)

( * ) Notice: Subject to any disclaimer, the term of this patent is extended or adjusted under 35 U.S.C. 154(b) by 552 days.

(21) Appl. No.: 10/458,854

(22) Filed: Jun. 11, 2003

(65) Prior Publication Data

US 2004/0250548 A1 Dec. 16, 2004

(51) Int. Cl.
*F02C 1/00* (2006.01)
*F02G 3/00* (2006.01)

(52) U.S. Cl. ............................. 60/752; 60/800; 60/804

(58) Field of Classification Search .................. 60/752, 60/800, 804

See application file for complete search history.

(56) References Cited

U.S. PATENT DOCUMENTS

| 4,912,922 | A | * | 4/1990 | Maclin | 60/796 |
| 4,916,906 | A |   | 4/1990 | Vogt |  |
| 5,291,732 | A | * | 3/1994 | Halila | 60/796 |

OTHER PUBLICATIONS

Brockett, "LV100 AIPS Technology—For Future Army Propulsion," ASME 92-GT-391, Jun. 1992, pp: 1-9.

* cited by examiner

*Primary Examiner*—Charles G. Freay
(74) *Attorney, Agent, or Firm*—William S. Andes; Francis L. Conte

(57) ABSTRACT

An outer combustor wall (36) includes an outer support shell (40) surrounding an outer combustion liner (42). The shell (40) includes a first radial aft flange (46), and the liner (42) includes a second radial aft flange (48) axially adjoining the first flange. An annular retainer (50) and seal (62) are joined to the first flange for slidingly trapping the second flange therebetween for thermally floating the liner on the shell.

20 Claims, 4 Drawing Sheets

US 7,093,440 B2

FLOATING LINER COMBUSTOR

The U.S. Government may have certain rights in this invention in accordance with Contract No. DAAE07-00-C-N086 awarded by the Department of the Army.

BACKGROUND OF THE INVENTION

The present invention relates generally to gas turbine engines, and, more specifically, to combustors therein.

A typical gas turbine engine includes a multistage compressor for pressurizing air which is mixed with fuel in a combustor for generating hot combustion gases. The gases flow through a high pressure turbine (HPT) which extracts energy for powering the compressor. A low pressure turbine (LPT) extracts additional energy for providing output work, such as powering a fan in a turbofan aircraft engine application, or providing output shaft power in land-based or marine applications.

In designing a turbine engine for powering a military vehicle, such as a main battle tank, the size and weight of the engine must be as small as possible, which correspondingly increases the difficulty of integrating the various engine components for maximizing performance, efficiency, and life. For example, one engine being developed includes an exhaust heat exchanger or recuperator which uses the hot combustion gases discharged from the turbines for additionally heating the pressurized air discharged from the compressor for increasing engine efficiency. However, this hot pressurized air must also be used for cooling the combustor components themselves which further increases the complexity of the combustor design.

In the last two decades, a double-wall combustor design underwent considerable development effort which did not lead to commercial production thereof. Radially outer and inner combustion liners were supported from corresponding radially outer and inner annular supports. Compressor discharge air was channeled through apertures in the supports for impingement cooling the outer surfaces of the liners. The spent impingement air was then channeled through film cooling and dilution holes in the liners for cooling the liners themselves, as well as providing dilution air for the combustion gases generated in the annular combustion chamber.

A consequence of the double wall combustor design is the inherent difference in operating temperature between the liners and the surrounding supports. Differential operating temperatures results in differential thermal expansion and contraction of the combustor components. Such differential thermal movement occurs both axially and radially, as well as during steady state or static operation and during transient operation of the engine as power is increased and decreased.

The liners must therefore be suitably mounted to their supports for accommodating differential thermal movement therebetween, while also minimizing undesirable leakage of the pressurized air coolant. The liners must be mounted concentrically with each other and with the supports to minimize undesirable variations in temperature distribution, both radially and circumferentially around the outlet end of the combustor as represented by the conventionally known pattern and profile factors.

Liner alignment or concentricity with the turbine is therefore an important design objective for an annular combustor, and is rendered particularly more difficult due to the double-wall liner configuration. Liner alignment affects all aspects of the combustor performance including cooling thereof, dilution of the combustion gases, and turbine performance. And, liner mounting to the supports must minimize thermally induced stress therein for ensuring maximum life of the combustor during operation.

The development combustor disclosed above was designed for proof-of-concept and lacked production features for the intended service life requirements in the tank application. For example, studs were welded to the outer liner and simply bolted to the outer support for mounting the outer liner thereto. This bolted design inherently fails to accommodate differential thermal movement between the liner and outer support and results in considerable thermal stresses during operation.

Accordingly, it is desired to provide an improved double-wall combustor design for accommodating differential thermal movement during operation while maintaining concentricity of liner support.

BRIEF DESCRIPTION OF THE INVENTION

An outer combustor wall includes an outer support shell surrounding an outer combustion liner. The shell includes a first radial aft flange, and the liner includes a second radial aft flange axially adjoining the first flange. An annular retainer is joined to the first flange for slidingly trapping the second flange therebetween for thermally floating the liner on the shell.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
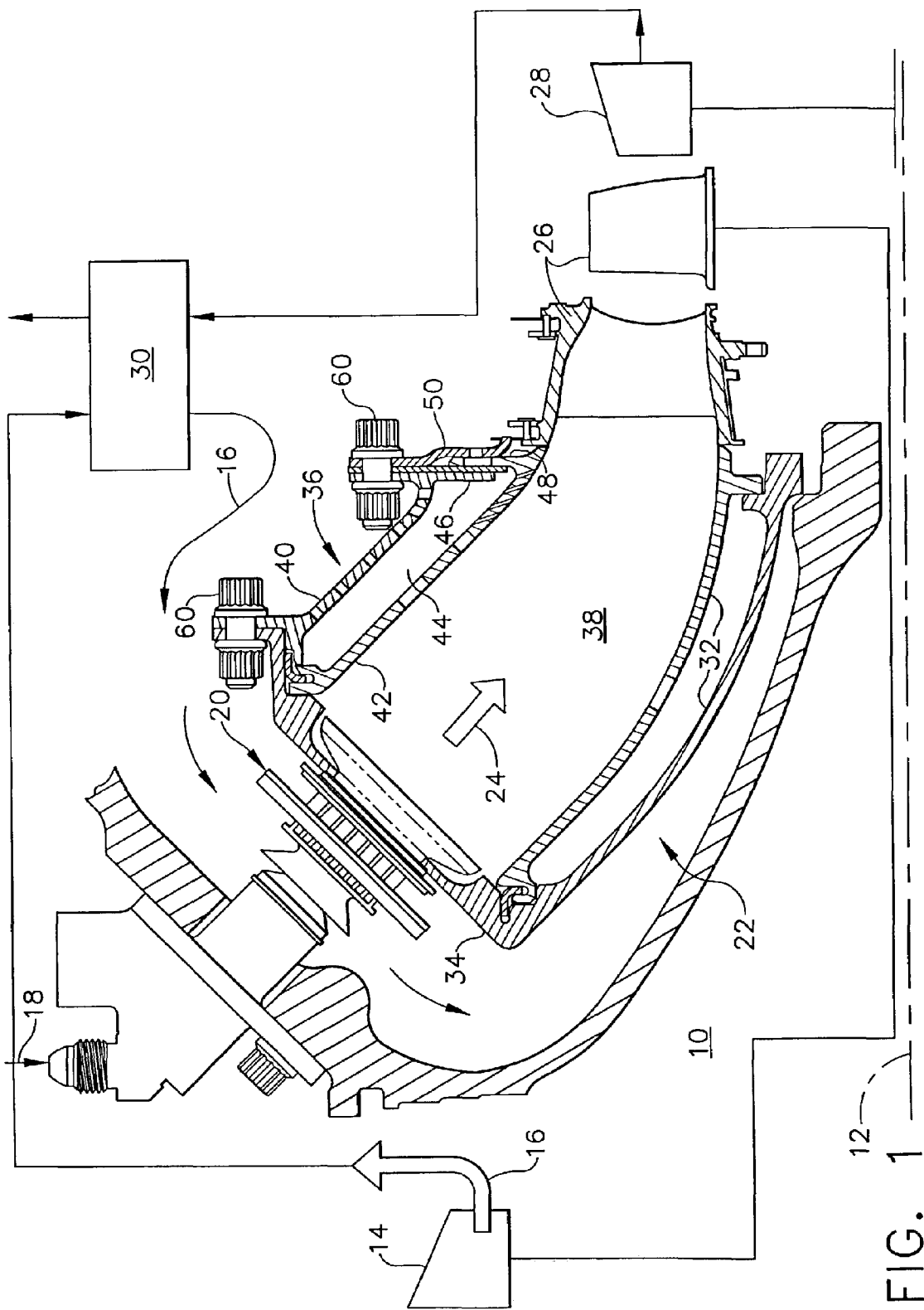
FIG. 1 is a partly sectional, schematic view of a gas turbine engine having one embodiment of a double-wall combustor for powering a land-based vehicle.

Illustrated schematically in FIG. 1 is a gas turbine engine 10 configured for powering a land-based vehicle, for example. The engine is axisymmetrical about a longitudinal or axial centerline axis 12, and includes a multistage compressor 14 for pressurizing air 16 during operation.

The pressurized air discharged from the compressor is mixed with fuel 18 in a row of carburetors 20 mounted in an annular combustor 22 for generating hot combustion gases 24.

The combustion gases are discharged from the combustor into a high pressure turbine (HPT) 26 which extracts energy therefrom for powering the compressor 14. The high pressure turbine is conventional and includes an annular stator nozzle at the discharge end of the combustor which directs the combustion gases through a row of high pressure turbine rotor blades extending outwardly from a supporting rotor disk joined by a shaft to the compressor rotor.

A low pressure turbine (LPT) 28 follows the HPT and conventionally includes one or more stator nozzles and rotor blades for extracting additional energy for powering an output drive shaft, which in turn drives a transmission in the exemplary military tank application.

An exhaust heat exchanger or recuperator 30 receives the combustion gases from the LPT 28 for in turn further heating the compressor discharge air 16 suitably channeled thereto. The so-heated compressor discharge air is then channeled to the combustor for undergoing the combustion process, as well as providing cooling of the combustor components.

The annular combustor illustrated in FIG. 1 is axisymmetrical about the engine centerline axis 12 and includes an annular, radially inner wall 32 suitably joined to an annular dome 34 at the upstream end thereof. An annular, radially outer wall 36 is also joined to the common dome, and spaced radially outwardly from the inner wall to define an annular combustion chamber 38 therebetween.

The combustor dome includes corresponding apertures therethrough in which the row of carburetors 20 are suitably mounted. The carburetors may have any conventional form, and typically include counterrotating air swirlers having a central fuel injector therein. Fuel is discharged from the injectors into two concentric streams of the pressurized compressor air which swirl in opposite directions due to corresponding rows of swirling vanes in the swirler. The fuel is atomized and mixed with air and suitably ignited for generating the hot combustion gases 24 which are discharged from an annular outlet of the combustor for flow through the HPT 26.

Both the inner wall 32 and the outer wall 36 are assemblies of components for defining with the common dome the annular combustion chamber 38. The inner wall 32 may have any suitable form such as an annular combustion liner mounted to an annular inner supporting shell, and including suitable apertures for providing cooling thereof as well as combustion gas dilution. In the exemplary embodiment illustrated in FIG. 1, the inner shell is integral with the dome, and the inner liner is suitably mounted to the inner shell.

In view of the recuperator engine design illustrated in FIG. 1, the combustor is highly inclined and converges aft in the downstream direction at a large inclination angle of about 45 degrees with the centerline axis. The outer double-wall 36 is correspondingly shorter in axial length than the inner double-wall 32, and both outer and inner walls are subject to substantial differential thermal expansion and contraction movement during static and transient operation of the engine. A significant design objective is to maintain concentricity of the combustor outlet with the HPT 26 and ensure suitable circumferential and radial temperature distributions of the combustion gases as represented by the conventionally known pattern and profile factors.

Figure 2:
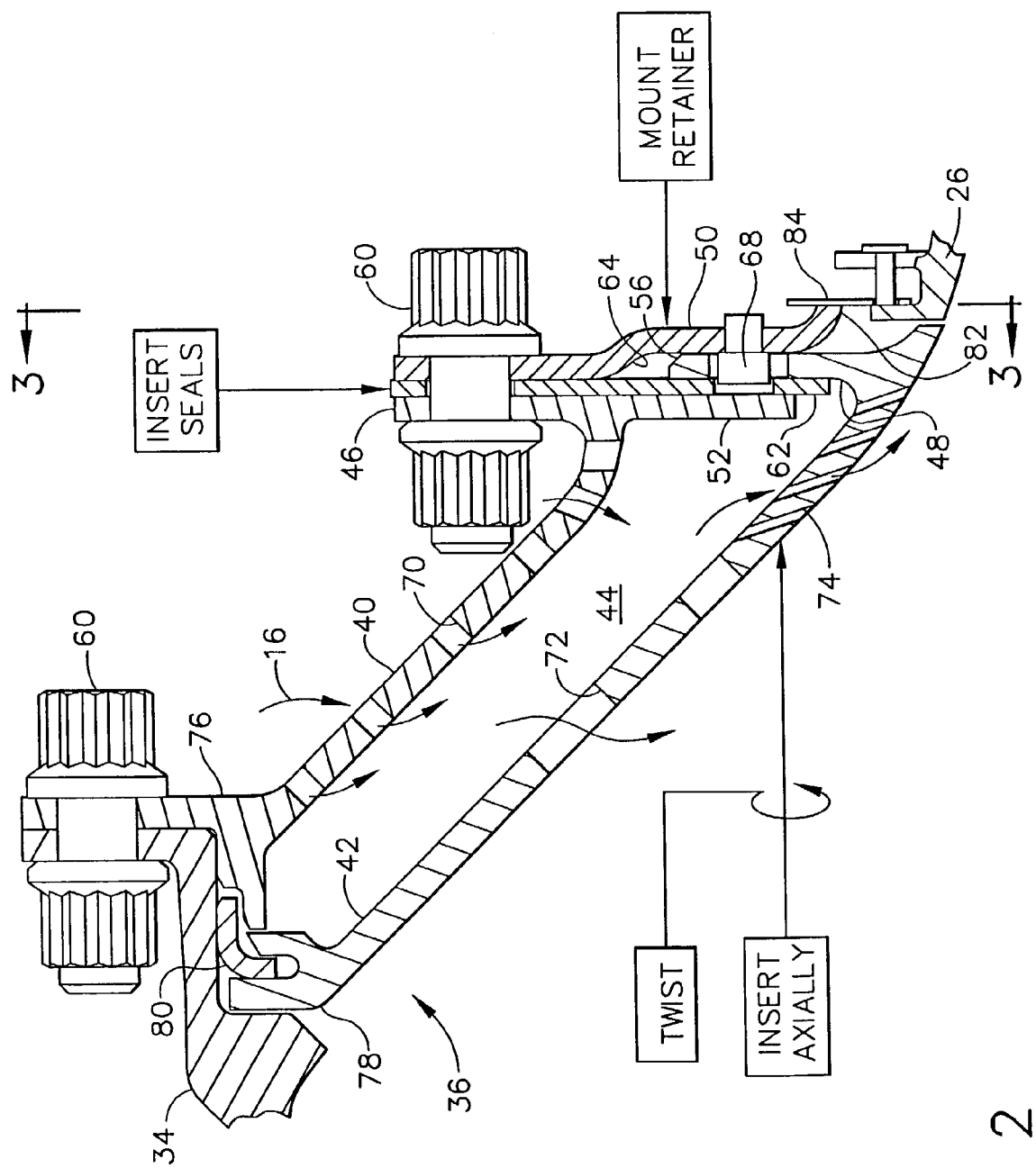
FIG. 2 is an enlarged axial sectional view of the combustor outer wall illustrated in FIG. 1.

The outer double-wall 36 is illustrated in a preferred embodiment in FIG. 2. The outer wall includes an annular outer support shell 40 surrounding a cooperating annular outer combustion liner 42. The outer liner is spaced radially inwardly from the outer shell to define an annular outer manifold or plenum 44 radially therebetween. The outer plenum extends axially aft from the upstream ends of the outer shell and liner to their downstream, aft ends adjoining the HPT 26.

The downstream end of the outer shell 40 includes a first annular radial aft flange 46, and the downstream end of the outer liner 42 includes a cooperating second annular radial aft flange 48 which axially adjoins the first flange.

An annular cover plate or retainer 50 is fixedly joined to the first flange 46 to slidingly trap the second flange 48 axially therebetween. In this way, the second flange 48 is free to radially expand and contract differently than the joined-together first flange and retainer for thermally floating the outer liner on the outer shell. Thermally induced stress is therefore significantly reduced or eliminated at the tongue-and-groove joint between the two aft flanges 46,48 and cover plate 50.

Figure 3:
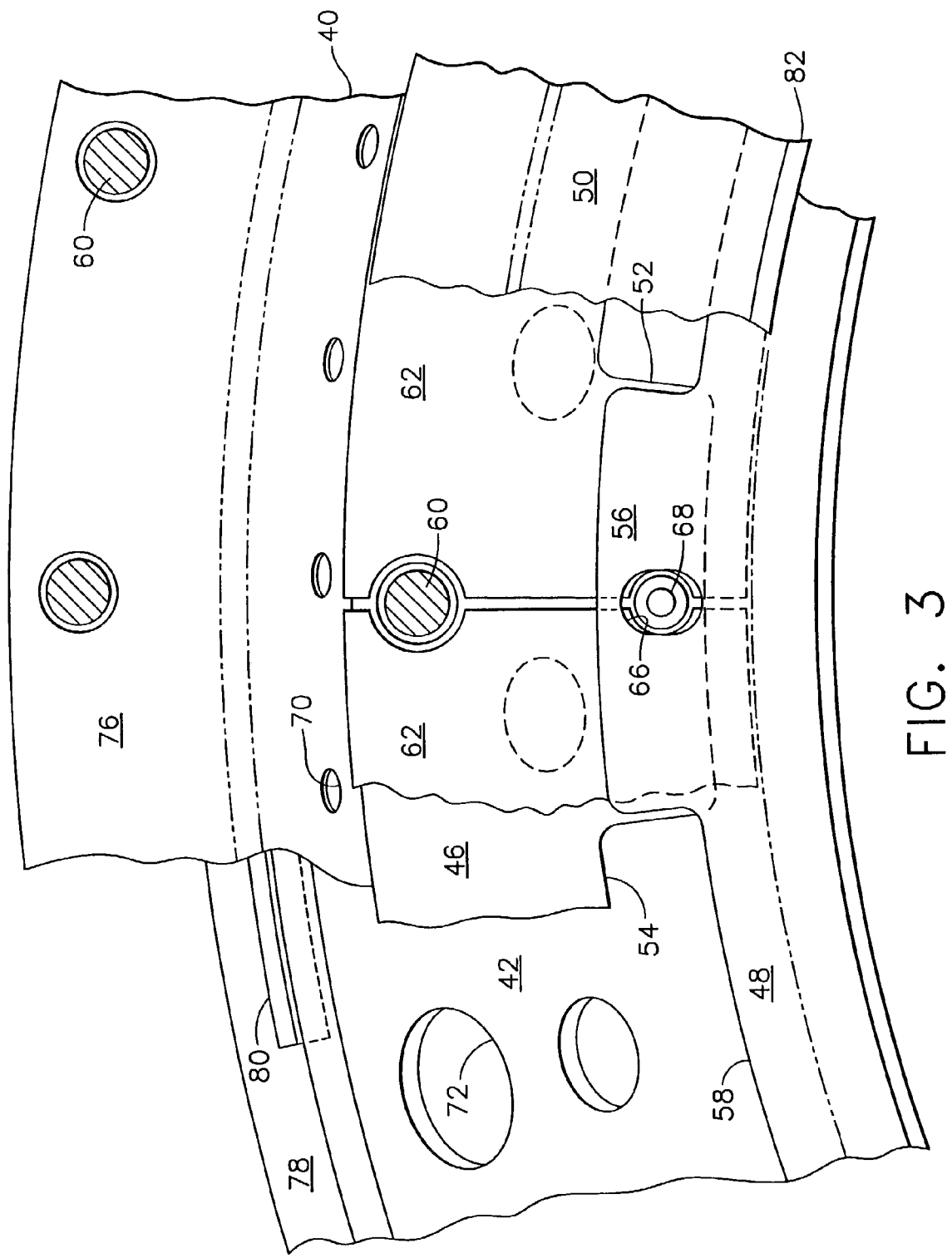
FIG. 3 is an aft-facing-forward view of a portion of the combustor outer wall illustrated in FIG. 2 and taken along line 3—3.
Figure 4:
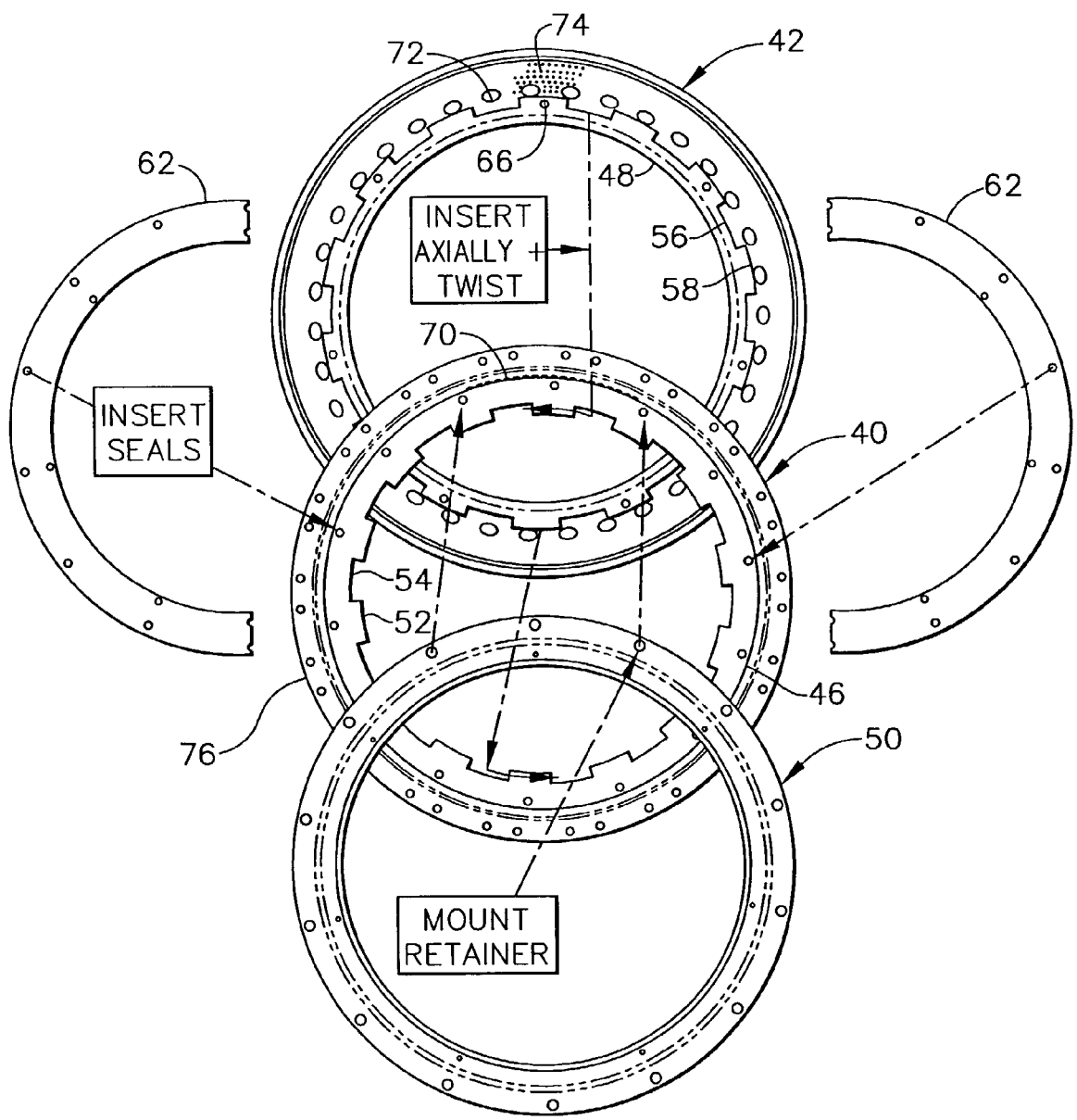
FIG. 4 is an exploded view of the combustor outer wall shown in FIG. 2 illustrating assembly of the components thereof.

As illustrated in FIGS. 3 and 4, the outer shell 40, outer liner 42, and retainer 50 are all fully annular, 360 degree components. In particular, the outer shell as shown in FIG. 3 is a unitary cone having a substantial inclination angle decreasing in diameter between its forward and aft ends. Similarly, the outer liner 42 is also a unitary cone substantially matching the decrease in diameter between its forward and aft ends for providing the annular plenum 44 therebetween with a substantially constant spacing between the two conical components. And, the retainer 50 is a unitary plate in the form of a ring which axially traps the aft liner flange 48 against the aft shell flange 46 while permitting differential thermal movement therebetween.

Since the outer shell and liner are conical members with radially extending aft flanges 46,48, suitable means are required for the assembly thereof and retention in the combustor. As shown in FIGS. 3 and 4, the first flange 46 includes a radially inwardly extending leg which is crenelated with radially inwardly extending first merlons or tabs 52 alternating circumferentially between corresponding first crenels or gaps 54. Correspondingly, the second flange 48 extends radially outwardly and is similarly crenelated with radially outwardly extending second merlons or tabs 56 alternating circumferentially with corresponding second crenels or gaps 58.

The crenelated aft flanges 46,48 permit axial assembly of the outer shell and liner 40,42 which conically converge aft thereto. The crenellations of the two aft flanges are complementary with each other for forming a bayonet-type mount between the two flanges.

As shown in FIGS. 3 and 4, the first merlons 52 are suitably smaller radially and circumferentially than the corresponding second crenels 58. Similarly, the second merlons 56 are suitably smaller both radially and circumferentially than the first crenels 54.

In this way, the conical outer liner 42 illustrated in FIG. 2 may be initially inserted axially left-to-right into the surrounding conical outer shell so that the corresponding merlons pass between the complementary crenels shown in FIG. 4, and then the outer liner is twisted circumferentially to axially align together the corresponding first and second merlons 52,56 illustrated in FIG. 3. In this bayonet assembly, the second merlons 56 axially adjoin the aft sides of respective ones of the first merlons 52 for axial retention. The retainer 50 illustrated in FIG. 2 then captures the aft end of the second merlons 56.

As shown in FIG. 2, the first flange 46 includes the crenelated radial inner leg extending radially inwardly from the shell, and also includes a plain radial outer leg extending radially outwardly from the shell. The flange outer leg includes a row of apertures extending axially therethrough, and the retainer 50 is fixedly joined to the outer leg of the flange 46 by a row of fasteners 60 such as threaded bolts and cooperating retention nuts.

Since the second flange 48 is simply trapped between the first flange 46 and the retainer 50, a thin annular ring seal 62 is disposed between the first and second flanges 46,48.

The ring seal 62 is preferably a thin flat plate clamped between the first flange 46 and the retainer 50. The retainer preferably includes an outer leg which is clamped to the seal 62 and the first flange 46 by the fasteners 60. The retainer also includes a radially inner leg which is spaced axially aft from the seal 62 and first flange to define a radially extending annular slot 64 which slidingly receives the second flange 48.

In this way, the annular outer liner 42 is free to expand and contract radially relative to the outer shell 40, with the difference in thermal movement therebetween being accommodated without restraint by sliding movement of the second flange 48 within the complementary radial slot 64 provided therefor. And, the seal 62 minimizes flow leakage around the second flange within its mounting slot 64.

However, suitable means are required to ensure concentricity between the outer liner 42 which floats freely inside the outer shell 40. As best illustrated in FIG. 3, the second flange 48 includes a plurality of circumferentially spaced apart axial apertures or slots 66 extending axially through corresponding ones of the second merlons 56. These alignment slots have a radially oval configuration with straight sides and arcuate top and bottom ends.

Correspondingly, the retainer 50 illustrated in FIG. 2 includes a plurality of circumferentially spaced apart alignment pins 68 extending forward therefrom into respective ones of the apertures 66.

Each pin 68 may have a small head mounted in a corresponding aperture in the retainer and tack welded thereto. An opposite larger head of the pin faces forwardly and is sized to fit within the available width of the alignment aperture 66. The alignment aperture has a suitable radial length for permitting unrestrained differential thermal expansion and contraction between the two flanges 46,48 during operation.

A minimum of three pins 68 and their cooperating alignment apertures 66 spaced apart from each other around the retainer will maintain concentricity between the outer liner and outer shell during operation, while also permitting unrestrained differential thermal expansion and contraction therebetween as well as preventing relative rotation between the liner and shell.

In the preferred embodiment illustrated in FIG. 4, seven pins 68 and their cooperating alignment apertures 66 are used around the circumference of the retainer and liner. And, the seal 62 includes corresponding axial apertures therein for receiving the distal ends of the pins and permitting unrestrained radial movement thereof.

Accordingly, the liner aft flange 48 is axially trapped between the shell aft flange 46 and the retainer 50, yet is allowed to freely expand and contract radially inside the slot 64. The alignment apertures 66 are radially elongate and larger in radial height than the ends of the pins 68 disposed therein for permitting unrestrained differential thermal movement between the second flange 48 and both the first flange 46 and retainer 50. Notwithstanding this permitted differential movement between the outer liner and shell, the seal 62 ensures an effective joint therebetween for minimizing undesirable flow leakage therethrough.

In the preferred embodiment illustrated in FIGS. 3 and 4, the seal 62 includes two discrete semi-circular ring plates with corresponding apertures therein for receiving the fasteners 60 and alignment pins 68. In this way, the outer liner may firstly be installed into the outer shell by axial insertion and twisting disclosed above for FIG. 2. The two 180 degree seals 62 may then be inserted radially inwardly between the axially aligned merlons 52,56 of the two flanges 46,48.

The retainer 50 with its pre-installed alignment pins 68 may then be axially mounted to the aft end of the two half-seals 62, with the fasteners 60 being installed for clamping together the retainer, seals, and outer leg of the first flange 46. The alignment pins 68 extend into the cooperating alignment apertures 66 in the second flange 48, with suitable clearance provided in the corresponding apertures of the seals 62.

As shown in FIG. 2, the outer shell 40 is perforate with a suitable pattern of impingement holes 70 for channeling the pressurized compressor air 16 into the outer plenum 44 for impingement cooling the outer surface of the outer liner 42.

The outer liner 42 is also perforate with suitable patterns of large dilution holes 72 and small film cooling holes 74 for channeling the spent impingement air through the liner for cooling the liner itself, as well as providing dilution of the hot combustion gases. The pressure of the spent impingement air inside the plenum 44 presses the liner aft flange 48 of the floating joint in abutment against the seal 62 for improving the seal effectiveness thereof. And, the first merlons 52 provide backing support for the seal 62 to minimize deflection thereof and further improve sealing.

As indicated above, the outer liner wall 36 is an assembly of components including the outer shell 40, the outer liner 42, the seals 62, and the retainer 50. The retainer 50 and the cooperating aft flanges 46,48 radially float the liner to the shell while restraining axial and circumferential movement therebetween.

The outer shell 40 further includes a forward flange 76 at the opposite forward end thereof, and the outer liner 42 correspondingly includes a second forward flange 78 at its forward end. The two forward flanges 76,78 are bridged together by a split-ring sleeve seal 80 arranged in a suitable tongue-and-groove engagement with the two flanges.

The first forward flange 76 preferably includes a radial leg which is fixedly joined to a corresponding flange of the combustor dome 34 by additional fasteners 60. The second forward flange 78 includes a radially outwardly facing slot in which a radially inwardly extending leg of the sleeve 80 is disposed. The sleeve 80 has a generally L-shaped axial cross section, with an axial leg bridging an axial leg of the first forward flange 76.

The sleeve 80 is trapped between the two forward flanges 76,78 and the dome 34 and provides an effective sliding seal therewith. Axial expansion and contraction movement of the outer liner 42 is accommodated by the floating sleeve 80 at the forward end of the outer liner, whereas radial expansion and contraction movement of the outer liner is accommodated by the free-floating aft flange 48 trapped within the radial slot 64.

Since both the outer shell 40 and outer liner 42 are fully annular, conical members, the sleeve 80 is preferably an annular member with a single split in its circumferential continuity. The sleeve has sufficient flexibility so that it may be elastically expanded for mounting in the forward flange 78 of the outer liner during assembly. In this way, the entire assembly of the outer wall 36 may be pre-assembled together, with this pre-assembly then being mounted to the combustor dome 34 using the corresponding fasteners 60 therefor.

As illustrated in FIG. 2, the forward flange 78 of the outer liner 42 provides continuity with the combustor dome 34 for containing the combustion gases therein during operation. Correspondingly, the aft end of the outer liner 42 includes a suitable lip which closely adjoins the outer band of the first stage nozzle in the HPT 26.

The inner leg of the retainer 50 preferably includes an axially arcuate lip 82 extending aft therefrom for sealingly engaging a leaf seal 84 suitably mounted to the turbine nozzle.

Accordingly, the combustor outer wall assembly 36 provides a free-floating outer liner for the combustion chamber with enhanced backside impingement cooling of the liner. The outer liner itself has effective multihole film cooling, as well as dilution apertures for trimming the combustion gases for achieving the desired circumferential and radial temperature pattern and profile factors.

The outer wall 36 accommodates differential thermal expansion and contraction of the liner and supporting shell both axially and radially, as well as during static and transient operation of the combustor. The outer liner is supported concentrically with the turbine nozzle, with unrestrained radial expansion and contraction relative thereto. The free-floating liner is prevented from rotating circumferentially by the pins, and maintains the circumferential alignment of the dilution holes relative to the turbine nozzle and to the carburetors 20.

Effective seals are provided at the forward and aft ends of the outer combustor wall, as well as between the outer wall and the turbine nozzle. And, the outer wall is removable from the combustor dome 34 as a complete assembly for permitting efficient maintenance thereof, including removal and replacement of the outer combustion liner 42.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A combustor comprising:
   an annular inner wall joined to an annular dome;
   an annular outer wall joined to said dome, and spaced radially outwardly from said inner wall to define an annular combustion chamber therebetween;
   said outer wall including an outer shell and an outer liner spaced radially apart to define an annular outer plenum extending aft from said dome;
   said outer shell including a first radial aft flange, and said outer liner includes a second radial aft flange axially adjoining said first flange; and
   an annular retainer joined to said first flange to slidingly trap said second flange therebetween for thermally floating said liner on said shell.

2. A combustor according to claim 1 wherein:
   said first flange is crenelated with radially inwardly extending first merlons; and
   said second flange is crenelated with radially outwardly extending second merlons axially adjoining respective ones of said first merlons.

3. A combustor according to claim 2 wherein:
   said second flange includes a plurality of circumferentially spaced apart alignment apertures extending axially therethrough; and
   said retainer includes a plurality of circumferentially spaced apart alignment pins extending into respective ones of said alignment apertures.

4. A combustor according to claim 3 wherein:
   said outer shell and outer liner conically converge aft to said first and second flanges thereof;
   said first flange includes corresponding first crenels circumferentially between said first merlons;
   said second flange includes corresponding second crenels circumferentially between said second merlons;
   said first merlons are smaller than said second crenels, said second merlons are smaller than said first crenels, and said first and second merlons radially overlap each other; and
   said alignment apertures in said second flange are radially elongate and larger than said alignment pins therein for permitting unrestrained differential thermal movement between said second flange and both said first flange and retainer.

5. A combustor according to claim 4 further comprising an annular seal disposed in abutment between said first and second flanges.

6. A combustor according to claim 5 wherein:
   said first flange includes a radial inner leg crenelated with said first merlons and first crenels, and a radial outer leg; and
   said retainer is joined to said outer leg by a row of fasteners extending through both said seal and outer leg.

7. A combustor according to claim 6 wherein said retainer comprises:
   an outer leg clamped to said seal and to said first flange by said fasteners;
   an inner leg spaced axially from said seal and said first flange to define an annular slot receiving said second flange; and
   said inner leg of said retainer includes a lip extending aft therefrom for sealingly engaging a leaf seal on a downstream turbine nozzle.

8. A combustor according to claim 7 wherein:
   said outer shell is a unitary cone;
   said outer liner is a unitary cone;
   said retainer is a unitary plate; and
   said seal comprises two semi-circular plates.

9. A combustor according to claim 8 wherein:
   said outer shell is perforate for channeling pressurized air into said outer plenum; and
   said outer liner is perforate for channeling said air therethrough for cooling said outer liner.

10. A combustor according to claim 9 wherein:
    said outer shell further includes a forward flange at a forward end thereof joined to said dome by a row of fasteners;
    said outer liner further includes a forward flange at a forward end thereof abutting said dome; and
    said forward flanges of said outer shell and outer liner are bridged together by a split sleeve in tongue-and-groove engagement therewith, and trapped inside said dome.

11. A combustor wall comprising:
    an outer support shell having a first radial aft flange;
    an annular outer liner spaced radially inwardly from said outer shell to define an outer plenum therebetween, and including a second radial aft flange axially adjoining said first flange; and
    an annular retainer joined to said first flange to slidingly trap said second flange therebetween for thermally floating said liner on said shell.

12. A wall according to claim 11 wherein:
    said first flange is crenelated with radially inwardly extending first merlons; and
    said second flange is crenelated with radially outwardly extending second merlons axially adjoining respective ones of said first merlons.

13. A wall according to claim 12 wherein:
said second flange includes a plurality of circumferentially spaced apart alignment apertures extending axially therethrough; and
said retainer includes a plurality of circumferentially spaced apart alignment pins extending into respective ones of said alignment apertures.

14. A wall according to claim 13 wherein said alignment apertures are radially elongate and larger than said pins therein for permitting unrestrained differential thermal movement between said second flange and both said first flange and retainer.

15. A wall according to claim 13 further comprising an annular seal disposed in abutment between said first and second flanges.

16. A wall according to claim 13 wherein:
said first flange includes a radial inner leg crenelated with said first merlons and first crenels, and a radial outer leg; and
said retainer is joined to said outer leg by a row of fasteners extending therethrough.

17. A wall according to claim 13 wherein said retainer comprises:
an outer leg clamped to said seal and to said first flange by said fasteners; and
an inner leg spaced axially from said seal and said first flange to define an annular slot receiving said second flange.

18. A wall according to claim 13 wherein:
said outer shell is a unitary cone;
said outer liner is a unitary cone; and
said retainer is a unitary plate.

19. A wall according to claim 13 wherein:
said outer shell is perforate for channeling pressurized air into said outer plenum; and
said outer liner is perforate for channeling said air therethrough for cooling said outer liner.

20. A wall according to claim 13 wherein:
said outer shell further includes a forward flange at a forward end thereof;
said outer liner further includes a forward flange at a forward end thereof; and
said forward flanges of said outer shell and outer liner are bridged together by a split sleeve arranged in tongue-and-groove engagement therewith.

* * * * *